United States Patent
Najor et al.

(10) Patent No.: US 6,183,017 B1
(45) Date of Patent: Feb. 6, 2001

(54) TELEPHONE CALLING CARD COUPON

(75) Inventors: Daniel B. Najor, 1625 Highland Cove, Solana Beach, CA (US) 92075; Fritz A. Brauer, Oceanside, CA (US)

(73) Assignee: Daniel B. Najor, Solana Beach, CA (US)

(*) Notice: Under 35 U.S.C. 154(b), the term of this patent shall be extended for 0 days.

(21) Appl. No.: 09/083,805

(22) Filed: May 22, 1998

(51) Int. Cl.[7] .................... B42D 15/00; B42D 15/02
(52) U.S. Cl. ................ 283/101; 283/56; 283/60.1; 283/70; 283/82; 283/901; 283/904
(58) Field of Search .................... 283/56, 60.1, 70, 283/82, 901, 904

(56) References Cited

U.S. PATENT DOCUMENTS

| | | |
|---|---|---|
| 5,489,123 * | 2/1996 | Roshkoff ............... 283/56 |
| 5,537,314 | 7/1996 | Kanter . |
| 5,720,500 * | 2/1998 | Okazaki et al. ............ 283/82 |
| 5,749,075 | 5/1998 | Toader et al. . |

FOREIGN PATENT DOCUMENTS

WO/96/31848  10/1996  (WO) .

\* cited by examiner

*Primary Examiner*—Andrea L. Pitts
*Assistant Examiner*—Mark T. Henderson
(74) *Attorney, Agent, or Firm*—Brown, Martin, Haller & McClain, LLP

(57) ABSTRACT

A user purchases a card and uses it to make pre-paid telephone calls via a telephone service provider system associated with the issuer of the card. After the account balance on the card is depleted, the user can present the card to a merchant or other party for redemption in the manner of a discount coupon for products or services.

4 Claims, 2 Drawing Sheets

TELEPHONE CALLING CARD COUPON

BACKGROUND OF THE INVENTION

1. Field of the Invention

The present invention relates to pre-paid telephone calling cards and also relates to discount coupons for goods and services. More specifically, the invention relates to a telephone calling card with an integral coupon, and to a method for using the card to place a telephone call and redeem the coupon.

2. Description of the Related Art

A pre-paid telephone calling card allows a person to make a telephone call without making a payment at the time the call is made. Rather, the cost of the telephone call is debited from a corresponding account during each call. Prior to making the telephone call, the person purchases the card in exchange for a payment that represents the initial balance of the account. The seller may be the company that provides the telephone service or may be a reseller of cards purchased from such a service provider or sold on behalf of the service provider. To make a telephone call to another party, the purchaser first makes a telephone call to the service provider, typically through a toll-free connection. The toll-free telephone number is typically printed on the card. The person then provides information to the service provider that identifies the account. Typically, the person simply uses the buttons of the telephone keypad to enter a number that is printed on the card. Such a number is commonly known as a personal identification number (PIN). Nevertheless, other types of pre-paid telephone calling cards have a magnetic stripe or similar medium that stores the PIN or other identifying information on the card in an electronically readable manner. Telephones having a means for reading a magnetic stripe can thus read the number or other identifying information automatically. The service provider's computer telephony system or switch receives and compares the identifying information to information in a database to verify the authenticity of the account. If the account is authentic, the system instructs the caller, typically by means of voice prompts, to dial the telephone number of the party to whom the caller wishes to speak. The system then completes the call by making the connection through the appropriate telephone companies and debits the caller's account by an amount proportional to the duration of the call. When the account balance falls to an amount not sufficient to pay for a call, the system prevents any further telephone service. The person may then discard the card and purchase a new card. Some service providers provide a feature that allows a person to recharge a card, i.e., increase the balance of the corresponding account, by making further payment. Nevertheless, the vast majority of telephone calling cards are considered disposable. Such a card has no further function once the balance of its corresponding account is depleted.

A discount coupon is a token, typically a slip of paper, that a consumer can redeem at a retailer of goods or services for a discount on the purchase price. A discount coupon is typically imprinted with the name of the product or service and the amount of the discount. For example, it may be imprinted with the text: "25¢ Off Purchase of Blort Cola." It is also typically imprinted with a bar code to facilitate redemption. A person may obtain coupons by cutting them out of a newspaper advertisement or other publication, by receiving them in a mailed advertisement, by removing them from a product or its packaging, or by other means. The manufacturer of a product is typically the party that causes the coupons to be issued. For example, the manufacturer or its agent, such as the manufacturer of the (fictitious) Blort brand cola in the example above, may have coupons printed in a newspaper advertisement. To redeem a coupon, the person typically presents the coupon to the retailer at the time he purchases the goods or services, and the retailer discounts the purchase price by the amount indicated on the coupon. The retailer subsequently presents the coupon to the manufacturer of the product for reimbursement of the discount amount. A consumer may sometimes redeem coupons in other ways, such as by mailing them to directly to the product manufacturer.

Although coupons are distributed to potential consumers of products and services in various ways as described above, it would be desirable to distribute them in yet other ways to increase the number of potential purchasers of a product or service. This need and others are satisfied by the present invention in the manner described below.

SUMMARY OF THE INVENTION

The present invention relates to a pre-paid telephone calling card and method for using it. A user purchases the card and uses it to make a telephone call in the conventional manner via a service provider system associated with the issuer of the card, but after the account balance corresponding to the initial payment is depleted (or at any other suitable time), the user presents the card to a retailer or other merchant for redemption in the manner of a discount coupon for products or services. The discount may be in any amount up to the full price of the goods or services. In addition, in certain embodiments of the invention the products or services may be advertised by providing an audible message to the user when the user accesses the service provider system. The product or service and the amount of the discount are provided on the card in a visually and/or electronically readable format. In other words, the product or service identification and the discount amount may be printed on the card or recorded on a magnetic stripe, bar code, solid-state memory chip, or other suitable device. In embodiments in which the information is electronically readable, the retailer or other merchant can use suitable electronic equipment such as a bar code scanner or magnetic stripe reader to obtain the information.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
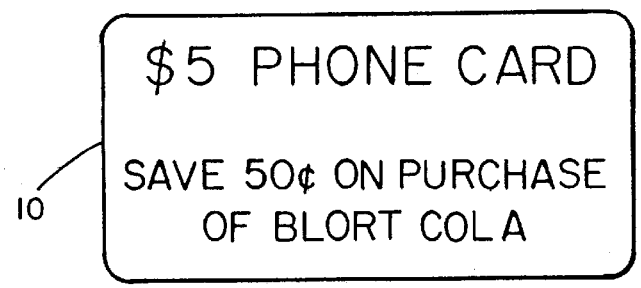
FIG. 1 is a top plan view of a telephone calling card of the present invention.
Figure 2:
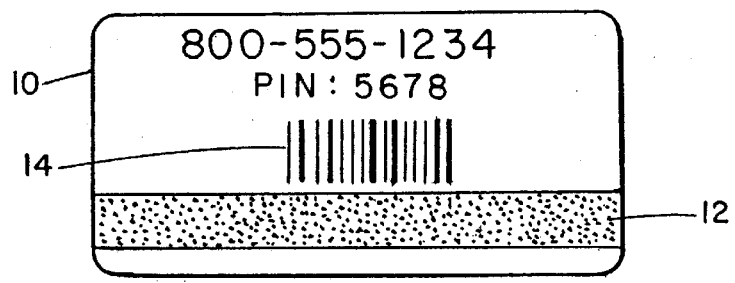
FIG. 2 is a bottom plan view of a telephone calling card of the present invention.

As illustrated in FIG. 1 the front surface of a telephone calling card 10 displays suitable graphic or textual indicia to convey to a user that the card is a telephone calling card and to convey its denomination. The illustrated card 10 includes the text "$5 PHONE CARD" to convey that the card has a value or denomination of five dollars and thus can be used to make one or more telephone calls totaling no more than five dollars in cost. Card 10 also displays suitable graphic or textual indicia to convey to a user that the card may be used to obtain a discount on the purchase of products or services in the manner of a conventional coupon. Card 10 includes, for purposes of illustration, the text "SAVE 50¢ ON PURCHASE OF BLORT COLA" to convey that the card has a redemption value of fifty cents for a (fictitious) product known as Blort cola. In other words, the user may use card 10 in the manner of a coupon to obtain a discount of fifty cents off the purchase price of the identified product. As illustrated in FIG. 2, the reverse surface of card 10 displays a telephone number for the user to call to contact the service provider. The number is typically a toll-free number, which in the United States typically includes the prefix "800" or "888." Card 10 includes, for purposes of illustration, the (fictitious) telephone number "800-555-1234." The reverse surface of card 10 also displays an access code or personal identification number (PIN). Card 10 includes, for purposes of illustration, the PIN "5678". The reverse surface also includes a magnetic stripe 12. Recorded on magnetic stripe 12 is the PIN, information identifying the product, and the discount or redemption amount. Other information may also be recorded on magnetic stripe 12. The information is recorded in any suitable manner known in the art that may be read by magnetic stripe readers. Magnetic stripes and magnetic stripe reader machines are well-known in the art and widely used in systems relating to debit-type cards. Therefore, magnetic stripe machines and the manner in which the information is recorded on and read from stripe 12 are not described in this patent specification. The reverse surface further includes a bar code 14 that also encodes the information identifying the product and the discount or redemption amount. Bar codes and bar code reader machines are well-known in the art and widely used in coupon redemption and point-of-sale systems. Therefore, bar code reader machines and the manner in which the information is recorded or encoded on and read from bar code 14 are not described in this patent specification. It should be noted that although both a magnetic stripe 12 and a bar code 14 are included in the illustrated embodiment, in other embodiments only one or the other or neither may be included. Moreover, magnetic stripe 12 and bar code 14 are only examples of suitable types of data recording media. In other embodiments the media may include, for example, a semiconductor memory chip or similar solid-state memory device. Such chips are well-known in debit cards known as "smart cards," which may include not only integral memory chips but also microprocessors and other devices.

Figure 3:
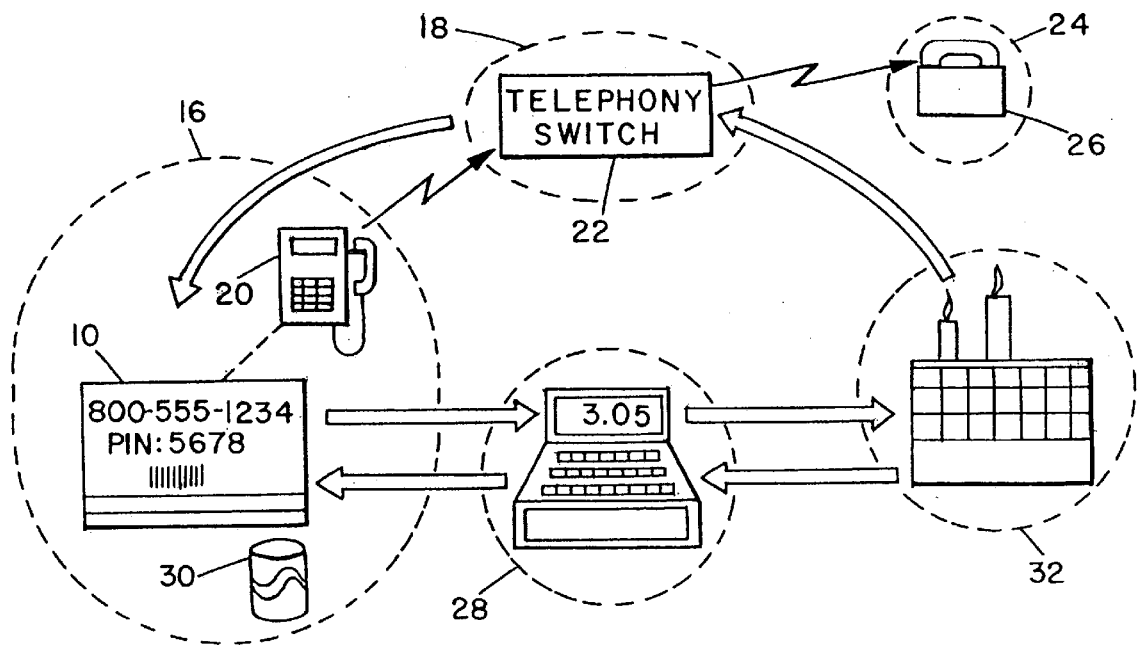
FIG. 3 illustrates a system relating to a telephone service provider that issues a calling card, a consumer who purchases the card and uses it to place a telephone call via the service provider's system, a retailer who redeems the card for the consumer as a product coupon, and the manufacturer of the product.

As illustrated in FIG. 3, a user, generally indicated by reference numeral 16, purchases card 10 from a telephone service provider, generally indicated by reference numeral 18. The purchase price corresponds to the initial balance of an account maintained by service provider 18. User 16 can make a telephone call using card 10. Thus, user 16 uses a telephone 20 to call service provider 18 by dialing the toll-free number indicated on card 10. From that point, the service provider's computer telephony system or switch 22 conducts the transaction with the user. Telephony switch 22 causes the call to be answered and provides voice prompts to the user directing him to enter a PIN using the telephone keypad or to pass card 10 through a magnetic stripe reader on telephone 20. Because such computer telephony switch systems are well-known in the art and widely commercially available, telephony switch 22 is not described in further detail in this patent specification. A feature of the invention is that telephony switch 22 also provides an advertising message or other voice message relating to the product identified on card 10. For example, the message may be: "Don't forget to give your calling card to your local Blort cola retailer for fifty cents off your next purchase of Blort cola."

Telephony switch 22 completes the call in the conventional manner. Thus, it retrieves from its database the balance of the account corresponding to the PIN that the user entered and determines whether it exceeds a predetermined threshold amount, such as zero dollars. More commonly, rather than zero, the threshold is the smallest amount that is sufficient to pay for the smallest increment of telephone calling time for which the service provider normally charges, typically a few cents. If the account balance is sufficient to pay for this increment of calling time, telephony switch 22 prompts user 16 to dial the number of the party, generally indicated by reference numeral 24, to whom user 16 desires to speak. Telephony switch 22 completes the connection via the public telephone network or one or more long-distance telephone companies, thereby causing the telephone 26 of party 24 to be rung. If party 24 answers and the call is thus completed, telephony switch 22 periodically debits the account during the call. If the account balance falls below the threshold amount, telephony switch 22 terminates the call.

When the account balance is depleted or, for that matter, at anytime after user 16 purchases card 10, user 16 can redeem card 10 at a retailer, generally identified by reference numeral 28, for the indicated discount on the purchase of the product 30. Thus, user 16 gives card 10 to retailer 28 at the time user 10 purchases product 30, and retailer 28 discounts the purchase price by the amount indicated on card 10. In the illustrated example, retailer 28 discounts the purchase price of the cola product by fifty cents. Retailer 28 may read the relevant coupon information encoded in bar code 14 in the conventional manner. The manufacturer of product 30, generally identified by reference numeral 32, in addition to selling product 30 to retailer 28, accepts card 10 and reimburses retailer 28 for the discount or redemption amount. Although card 10 is redeemed through retailer 28 in the illustrated embodiment, it should be noted that in other embodiments of the invention card 10 may be redeemed in any other suitable manner known in the art for redeeming coupons. For example, user 16 may send coupon 10 directly to manufacturer 32 or to another party. User 16 may receive, for example, a reimbursement on the purchase price or may receive discounted or free products, services, options to purchase products or services at discounts, tickets, or other value.

At the time user 16 purchases product 30 from retailer 28, retailer 28 may issue user 16 other coupons (not shown). Systems and methods are known in the art for automatically issuing coupons at the point of sale for products related to a product a consumer purchases. Therefore, the details of such systems and methods are not described in this patent specification. Nevertheless, such systems and methods may be included as an additional feature of the present invention.

Manufacturer 32 pre-arranges with service provider 18 to provide the coupon information on the calling cards that service provider 18 sells and to provide the voice messages advertising the products that manufacturer 32 sells. Although in the illustrated embodiment, service provider 18 causes the calling cards to be sold to consumers, in other embodiments manufacturer 32, its agent or a related party may sell calling cards directly to consumers. The transactions and business relationships described in this patent specification are intended to be only exemplary, and others will occur readily to persons skilled in the art to which the invention pertains.

Figure 4:
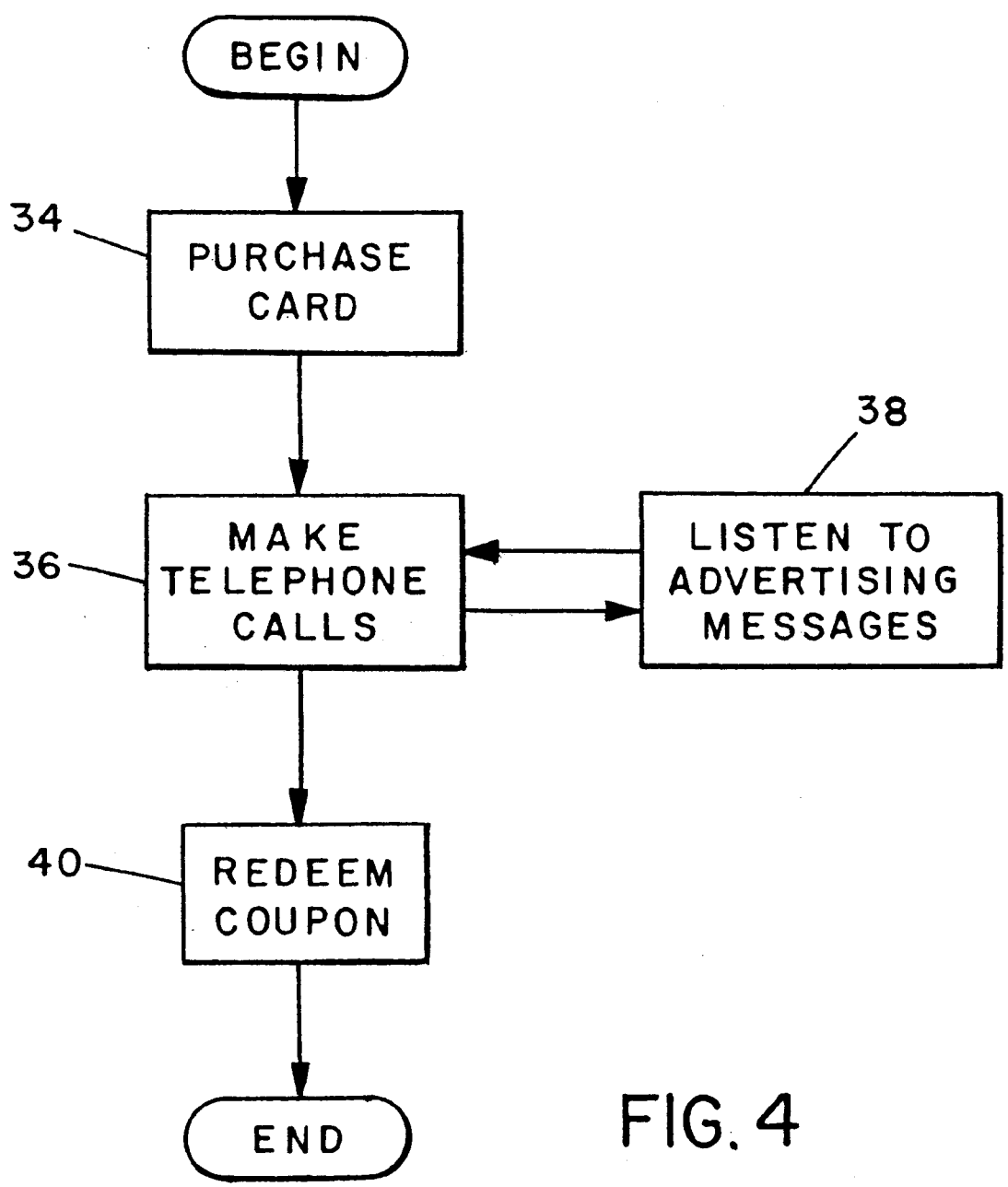
FIG. 4 is a flowchart illustrating the method of the present invention.

FIG. 4 summarizes the method of the present invention by which user 16 uses card 10 to make telephone calls and also to receive a discount on product 30. At step 34 user 16 purchases card 10 from service provider 18 or through another party, such as a convenience store. At step 36 user 16 makes one or more telephone calls via service provider 18. As indicated at step 38, at the time user 16 contacts service provider 18 to make a call, in addition to the conventional voice prompts provided to user 16, service provider 18 provides advertising messages or other voice messages relating to the product identified on card 10. At step 40 user 16 redeems card 10 as a coupon at retailer 28 upon purchasing product 30.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. A method for using a telephone calling card, comprising the steps of:

providing said telephone calling card to a user in exchange for a payment corresponding to an initial balance of an account, said telephone calling card associated with an access code, said access code associated with said account, and said telephone calling card bearing coupon indicia conveying a discount on a purchase;

said user making a telephone connection to a service provider system;

said user providing said access code to said service provider system;

said service provider system completing a telephone connection between said user and a called party if said balance of said account associated with said access code is greater than a predetermined minimum;

said service provider debiting said account balance in response to said telephone connection to said called party;

said user making a purchase in exchange for a payment;

said user presenting said telephone calling card to a seller in response to said purchase; and said seller discounting said payment in an amount of said discount indicated on said telephone calling card.

2. The method claimed in claim 1, further comprising the step of said service provider system providing during said telephone connection with said user an audible message to said user encouraging said user to make said purchase.

3. The method claimed in claim 1, wherein said discount is recorded on said telephone calling card on an electronically readable medium.

4. The method claimed in claim 3, wherein said electronically readable medium is a magnetic stripe.

* * * * *